United States Patent [19]

Bond et al.

[11] Patent Number: 4,712,956
[45] Date of Patent: Dec. 15, 1987

[54] PLASTIC WALL ANCHOR

[75] Inventors: Michael E. Bond, Topton; Fred R. Voreh, Wyomissing, both of Pa.

[73] Assignee: USM Corporation, Farmington, Conn.

[21] Appl. No.: 304,075

[22] Filed: Sep. 21, 1981

[51] Int. Cl.⁴ ............................................. F16B 13/06
[52] U.S. Cl. .......................................... 411/55; 411/34
[58] Field of Search ............................. 411/15, 34-38, 411/32, 33, 55, 70, 78, 173-175

[56] References Cited

U.S. PATENT DOCUMENTS

| | | | |
|---|---|---|---|
| 3,213,746 | 10/1965 | Dwyer | 411/15 |
| 3,651,734 | 3/1972 | McSherry | 411/15 |
| 4,181,061 | 1/1980 | McSherry | 411/55 |
| 4,221,154 | 9/1980 | McSherry | 411/55 |
| 4,274,324 | 6/1981 | Giannuzzi | 411/15 |

Primary Examiner—Neill Wilson
Attorney, Agent, or Firm—Thomas S. Szatkowski

[57] ABSTRACT

A plastic wall anchor receives a threaded fastener and thereafter flexes its curved leg portions in such a manner as to provide a firm anchoring to the wall. The wall anchor provides an indication as to when it is about to firmly anchor to the wall.

12 Claims, 7 Drawing Figures

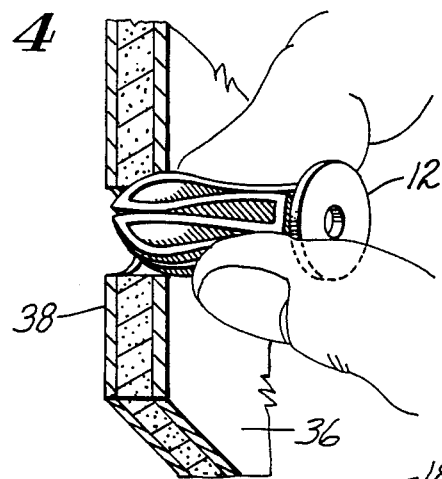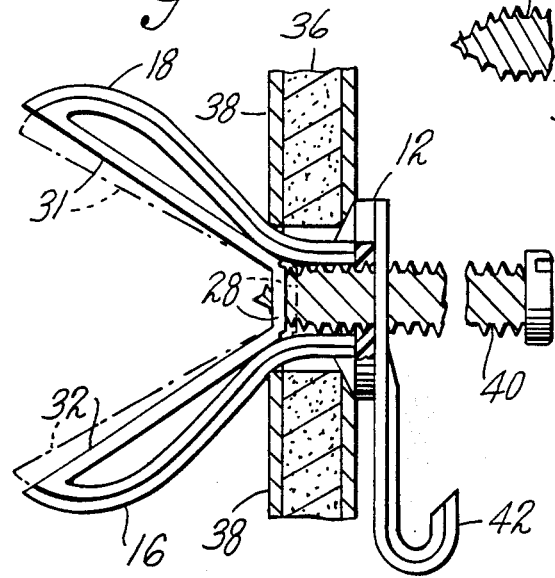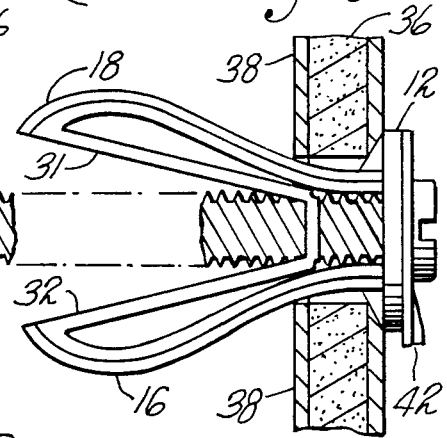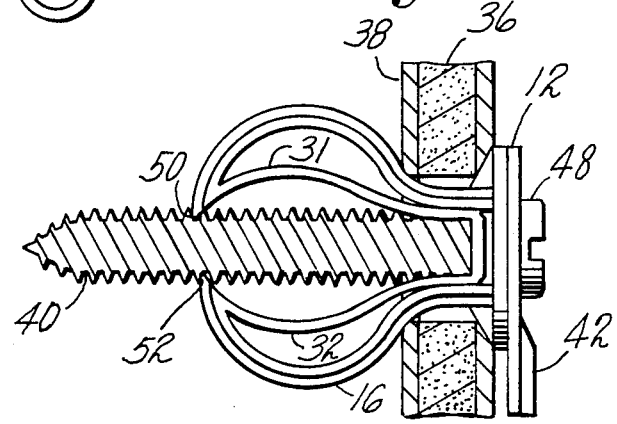

PLASTIC WALL ANCHOR

FIELD OF THE INVENTION

This invention relates generally to wall anchors insertable within an opening in a hollow wall or similar structure and in particular to plastic wall anchors of unitary construction.

BACKGROUND OF THE INVENTION

A number of wall anchors have been used in the past for securing or suspending articles from hollow walls or similar structures. These wall anchors are typically inserted into openings previously made within the wall. Some of these wall anchors have been fabricated from plastic in an attempt to take advantage of the characteristics of this flexible material. These anchors are usually premised on spreading the gripping legs of the wall anchor apart so as to firmly grip the back side of the wall. The legs are sometimes spread apart solely through the action of an inserted fastener cooperating with the legs so as to spread them apart. Examples of such anchors are disclosed in U.S. Pat. Nos. 3,431,813 and 4,022,100. Still other plastic wall anchors utilize a toggle member which spreads the legs apart via a "toggling" action. Examples of the latter toggle action anchors are disclosed in U.S. Pat. Nos. 3,651,734 and 4,181,061. None of the aforementioned plastic anchors are premised on an appreciable flexing of the gripping legs so as to produce a pronounced curvature in the gripping legs.

OBJECTS OF THE INVENTION

It is an object of this invention to provide an improved wall anchor which can be quickly and easily inserted into a wall opening and which can thereafter form a firm anchoring base.

It is another object of this invention to provide a plastic wall anchor capable of being appreciably flexed so as to provide a firm anchoring base to the wall.

It is yet another object of this invention to provide a plastic wall anchor having the capability to indicate when the fastener is to be appreciably flexed so as to provide the firm anchoring to the wall.

SUMMARY OF THE INVENTION

The above and other objects are achieved by a plastic wall anchor of unitary construction having a head portion, a pair of reverse curved legs extending outwardly from the head portion and a collapsible member extending between the ends of the reverse curved legs. The collapsible member collapses toward the head portion when the support legs are sqeezed so as to allow the anchor to be inserted into a wall opening. A threaded fastener inserts into the hole in the head portion and initially expands the support legs a small amount so as to create a firm outward pressure against the wall opening. The threaded fastener subsequently engages an aligned aperture hole in the collapsible member and thereafter draws the collapsible member down toward the head portion. As the collapsible member is being drawn down, the wall anchor loosens within the wall opening. This momentary loosening provides an indication that the curvature of the flexible support legs is about to increase so as to produce a firm anchoring to the wall.

BRIEF DESCRIPTION OF THE DRAWINGS

The above and other features of the invention will now be particularly described with reference to the accompanying drawings in which:

FIG. 4 illustrates the insertion of the plastic anchor into a wall; and

FIGS. 5, 6 and 7 illustrate various flexed states of the wall anchor in response to the insertion and threading of a fastener.

DESCRIPTION OF THE PREFERRED EMBODIMENT

Figure 1:
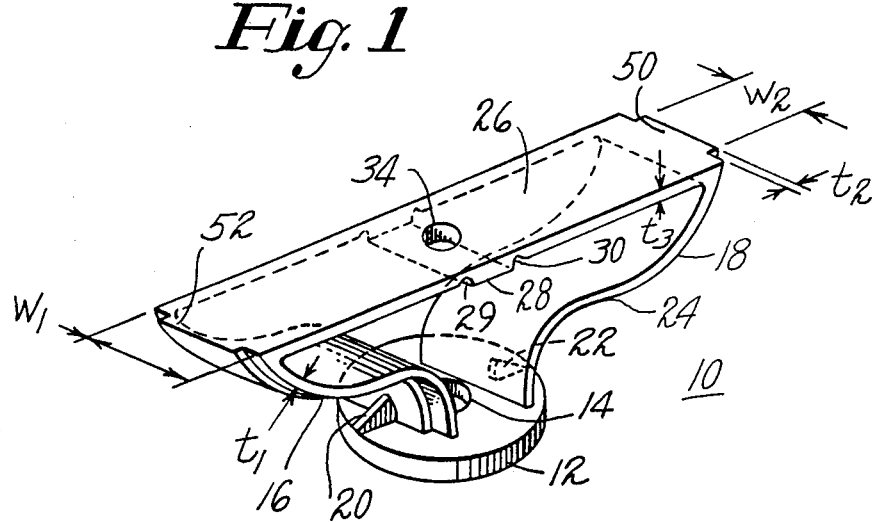
FIG. 1 is an overall perspective view of the plastic anchor according to the present invention.
Figure 2:
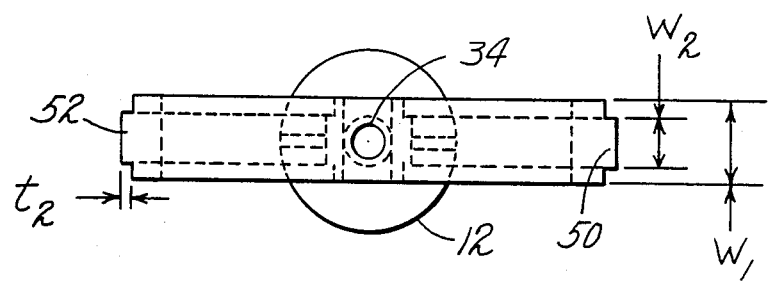
FIG. 2 is a plan view of the plastic anchor.
Figure 3:
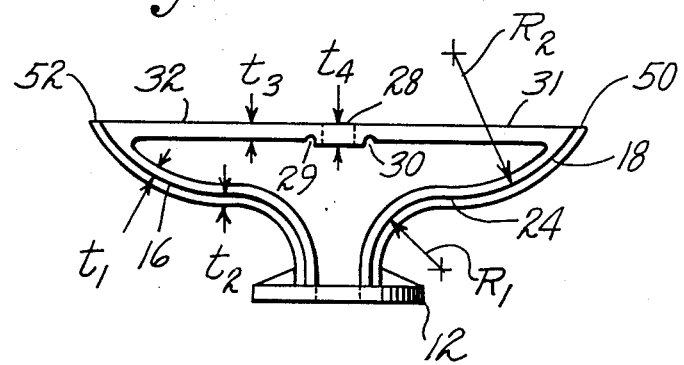
FIG. 3 is an elevational view of the plastic anchor.

Referring to FIG. 1, a plastic wall anchor 10 is generally illustrated. FIGS. 2 and 3 are top and elevational views of the plastic wall anchor 10. The plastic wall anchor is preferably fabricated from a plastic material exhibiting appreciable flexibility as will be hereinafter discussed. Such a plastic is preferably a thermoplastic nylon 6 from the homo polymer family.

The plastic wall anchor 10 is seen to include a head portion 12 having an aperture 14 capable of receiving a fastener such as a threaded screw. The head portion 12 constitutes a base for a pair of upwardly extending legs 16 and 18 each having only small base supports 20 and 22 constituting part of the anchor's unitary structure. The legs 16 and 18 are each seen to have a thickness $t_1$ over a width $w_1$ and to have a buildup of plastic material indicated by a thickness $t_2$ over a width of $w_2$. The thicknesses $t_1$ and $t_2$ are preferably each 1/32 of an inch (0.079 centimeters) whereas $w_1$ equals 9/32 inch (0.714 cm.) and $w_2$ equals 5/32 inch (0.397 cm.). The legs 16 and 18 are also seen to have reverse curved shapes comprising a first radius of curvature denoted as $R_1$ in FIG. 3 and a second radius of curvature denotes as $R_2$ in FIG. 3. The first radius of curvature $R_1$ defines the substantial upward extension of the leg 18 from the head portion 12. A small relatively straight portion 24 links the first radius of curvature $R_1$ with respect to the second radius of curvature $R_2$. The second radius of curvature $R_2$ defines an arc of uniform radius which terminates in an upwardly sweeping fashion. The second radius of curvature $R_2$ is approximately two times the radius of curvature $R_1$. In this regard, the preferred radius of curvature $R_1$ is equal to 7/32 inch (0.556 cm.) and the preferred radius of curvature $R_2$ is equal to 15/32 inch (1.19 cm.).

A collapsible member 26 extends between the upwardly sweeping arc endings of the reverse curved legs 16 and 18. The curved arc endings of the reverse curve legs 16 and 18 constitute an important structural contribution to the anchoring function achievable by the plastic anchor 10. This will be explained in detail hereinafter.

The collapsible member 26 is seen to include a middle portion 28 defined by a pair of notches 29 and 30 in the collapsible member. The collapsible member further includes side portions 31 and 32 each having a uniform thickness $t_3$ which is preferably 3/64 inch (0.119 cm.). The middle portion 28 is slightly raised relative to the thickness $t_3$ and is preferably of a thickness $t_4$ equal to 1/16 inch (0.159 cm.). The slightly raised middle portion 28 has a hole 34 of sufficient depth to accommodate an appreciable amount of the threaded fastener passing therethrough. In this regard the middle portion 28 is similar to a nut being threaded onto the fastener passing therethrough. The notches 29 and 30 define the weakened areas which allow the collapsible member 26 to easily collapse when the plastic anchor 10 is squeezed between two fingers such as is shown in FIG. 4. The middle portion 28 moves toward the underside of the head portion 12 so as to maintain alignment of the holes 14 and 34.

It is to be noted that the middle portion 28 will remain at a fixed minimal distance from the underside of the head portion 12 when the plastic anchor is squeezed between the fingers. This fixed minimal distance is attributable to the shorter lengths of the side portions 31 and 32 relative to the longer lengths of the reverse curved legs 16 and 18. The fixed minimal distance is preferably at least ⅛ inch (0.318 cm.). The plastic anchor 10 is squeezed to the point where the legs 16 and 18 fit through a wall board 36.

The legs 16 and 18 of the anchor 10 will spread apart when they reach the back side 38 of the wall board 36. This is illustrated by the dotted outline position of the legs 16 and 18 in FIG. 5. In this regard, it is to be noted that the dotted outline of the middle portion 12 remains at approximately the aforementioned fixed minimal distance from the underside of the head portion 12.

The wall anchor 10 in FIG. 5 is shown as actually having already partially received a threaded fastener 40. The threaded fastener 40 is seen to be first inserted through a hole in a hook 42 as well as through the hole 14 in the anchor. The hook 42 is merely illustrative of a type of device which may be attached to the wall via the fastener 40. It is to be noted that with the head portion 12 flush against the wall board 36, the first $R_1$ curvature portion of each of the legs 16 and 18 will be naturally biased against the sides of the pre-formed hole. This natural bias will be complemented by an outward pressure produced by the threaded fastener 40 being further threaded into the hole 14 so as to engage the middle portion 28 of the collapsible member 26. In other words, the threaded engagement of the hole 34 in the middle portion 28 will cause the middle portion to initially move away from the head portion 12. This outward movement of the middle portion 28 causes the legs 16 and 18 to spread as the side portions 31 and 32 of the collapsible member push the ends of the legs outwardly. This results in an increased biasing of the first $R_1$ curvature portions of each leg 16 and 18 with respect to the pre-formed hole. This produces a firm feeling to anyone threading the fastener 40 into the wall anchor 10. It is to be noted that the outward movement of the middle portion 28 will only take place when the fastener 40 initially engages the hole 34. In this regard the hole 34 is sized so as to require a boring out by the threads of the fastener 40. This enlarging of the hole will take place until the hole does not further experience an increasing screw diameter. In other words, the outward movement of the middle portion 28 will cease when the tip of the screw is all the way through the hole 34.

The fastener 40 is continuously threaded into the wall anchor 10 without any further appreciable change in its flexed status until the head 48 of the fastener contacts the head portion 12 of the wall anchor. At this time, the further rotation of the fastener 40 will draw the middle portion 28 of the collapsible member toward the head portion 12 of the wall anchor. This action causes the side portions 31 and 32 of the collapsible member 26 to draw the ends of the reverse curved legs 16 and 18 toward each other as well as toward the head portion. As this occurs, the complementary biasing pressure produced by the flexed legs 16 and 18 of FIG. 6 is somewhat relaxed. In other words, as the legs 16 and 18 move toward each other, the first $R_1$ curvature portions of each leg also move in the same direction so as to no longer be flexed toward the inner wall of the hole. This results in a slight looseness sensation being experienced by one rotating the head 48 of the fastener. This slight looseness sensation is soon replaced with a feeling of firmness as the fastener head 48 is further rotated. Specifically, the threaded engagement of the fastener 40 with the hole 34 causes the middle portion 28 to move toward the head portion 12. This movement is only limited by the fixed minimal distance between the middle portion 28 and the underside of the head portion 12. Referring to FIG. 7, the wall anchor 10 is illustrated in the flexed state which occurs after the fastener head 48 has been further rotated. The ends of the legs 16 and 18 have moved into contact with the threaded fastener 40. The second $R_2$ curvature portions of the legs 16 and 18, have furthermore become increasingly bowed as the respective ends of the legs are pulled down by the side portions 31 and 32 of the collapsible member. This increase in the second curvature of each leg is illustrated in FIG. 7 wherein the angular slope of the legs has increased relative to the side portions 31 and 32 at the respective ends 50 and 52 of each leg. Referring to FIG. 1, it is seen that the ends 50 and 52 are actually solid for the thickness of $t_2$ which allows for contact between the threads of the fastener 40.

Referring again to FIG. 7, the accentuated second $R_2$ curvature of each leg 16 and 18 is seen to produce a firm biasing effect on the wall opening at the back side 38 of the wall. This provides a firm anchoring base for the fastener 40 as well as the hook 42 so as to allow for an appreciable weight to be hung or otherwise attached to the wall 36.

From the foregoing, it is to be appreciated that a preferred embodiment of a plastic wall anchor has been disclosed. It is to be appreciated that alternative structure might be used without departing from the scope of the present invention.

What is claimed is:

1. A plastic wall anchor which is to receive and hold a threaded fastener in a flexed state, said plastic wall anchor comprising the following when in an unflexed state prior to receipt of the threaded fastener:
   a head portion having a hole therein for receiving the threaded fastener;
   a pair of reverse curved legs extending from said head portion to either side of the hole therein; and
   a collapsible member extending between said pair of reverse curved legs and having a hole therein which is substantially in alignment with the hole in said head portion, said collapsible member having ends connected to the ends of said pair of reverse curved legs, said reverse curved legs each having a curved arc portion of definable radius below said collapsible member and immediate to one of said end connections so as to define a substantial open space between said collapsible member and the respective reverse curved leg thereby allowing said curved arc portion to flex.

2. The plastic wall anchor of claim 1 wherein said collapsible member comprises a middle portion and two side portions, said side portions being connected to said middle portion via notched recesses in said collapsible member which allows the middle portion to easily move toward said head portion when said reverse curved legs are squeezed together.

3. The plastic wall anchor of claim 2 wherein said middle portion of said collapsible member is substantially spaced from said head portion when said reverse curved legs are squeezed due to the substantially greater length of each reverse curved leg relative to the length of each side portion of the collapsible member.

4. The plastic wall anchor of claim 3 wherein said middle portion of said collapsible member is drawn toward said head portion for a substantial distance so as to increase the curvature of said curved arc portions having definable radius of curvatures immediate to said end connections.

5. The plastic wall anchor of claim 2 wherein the hole in said collapsible member is located in said middle portion and is substantially smaller than the thread diameter of the fastener so that said middle portion initially travels outwardly from said head portion.

6. The plastic wall anchor of claim 1 wherein said reverse curved legs comprise first curvatures which extend upwardly and outwardly in opposing directions from said head portion and second curvatures which extend further outwardly in opposing directions and upwardly in curved arcs so as to define one of said curved arc portions immediate to an end connection of the collapsible member.

7. The plastic wall anchor of claim 6 wherein said reverse curved legs are of uniform thickness along their entire length extending from the head portion to the end connections.

8. The plastic wall anchor of claim 7 wherein said reverse curved legs have two uniform thicknesses in the widthwise dimension, the first uniform thickness being approximately twice the second uniform thickness.

9. A plastic wall anchor which is to receive and hold a threaded fastener in a flexed state, said plastic wall anchor comprising the following when in an unflexed state prior to receipt of the threaded fastener:
a head portion having a hole therein for receiving the threaded fastener;
a pair of reverse curved legs, each having a first curvature which extends upwardly and outwardly in opposing directions from said head portion, said reverse curved legs furthermore having second curvatures which extend further outwardly in opposing directions and upwardly in smooth curved arcs of definable radius of curvature to terminating points; and a collapsible member extending between the terminal points of said pair of reverse curved legs and having a hole therein which is substantially in alignment with the hole in said head portion, said collapsible member being spaced from the second curvatures of said reverse curved legs so as to define a substantially open space between said collapsible member and said second curvatures.

10. The plastic wall anchor of claim 9 wherein said collapsible member comprises a middle portion and two side portions, said side portions being connected to said middle portion via notched recesses in said collapsible member which allows the middle portion to easily move toward said head portion when said reverse curved legs are squeezed together.

11. The plastic wall anchor of claim 10 wherein said middle portion of said collapsible member is substantially spaced from said head portion when said reverse curved legs are squeezed due to the substantially greater length of each reverse curved leg relative to the length of each side portion of the collapsible member.

12. The plastic wall anchor of claim 11 wherein said middle portion of said collapsible member is drawn toward said head portion for a substantial distance so as to increase the curvature of said curved arcs having definable radius of curvatures immediate to said end connections.

* * * * *